United States Patent
Rogers

(10) Patent No.: US 10,631,019 B2
(45) Date of Patent: Apr. 21, 2020

(54) REMOTE STORAGE DIGITAL VIDEO RECORDING OPTIMIZATION METHOD AND SYSTEM

(71) Applicant: Concurrent Computer Corporation, Duluth, GA (US)

(72) Inventor: Thomas J. Rogers, Sellersville, PA (US)

(73) Assignee: Vecima Networks Inc., British Columbia (CA)

( * ) Notice: Subject to any disclaimer, the term of this patent is extended or adjusted under 35 U.S.C. 154(b) by 1338 days.

(21) Appl. No.: 13/920,736

(22) Filed: Jun. 18, 2013

(65) Prior Publication Data

US 2014/0373080 A1 Dec. 18, 2014

(51) Int. Cl.
*H04N 21/00* (2011.01)
*H04N 21/231* (2011.01)
*H04N 21/2747* (2011.01)

(52) U.S. Cl.
CPC ..... *H04N 21/23113* (2013.01); *H04N 21/231* (2013.01); *H04N 21/23116* (2013.01); *H04N 21/2747* (2013.01)

(58) Field of Classification Search
CPC ......... G06F 17/30088; G06F 17/30598; G06F 17/3012; H04N 21/23113; H04N 21/231; H04N 21/23116; H04N 21/2747
USPC ........................................ 707/648, 640, 696
See application file for complete search history.

(56) References Cited

U.S. PATENT DOCUMENTS

| | | | |
|---|---|---|---|
| 6,804,746 B2 | 10/2004 | Duruoz | |
| 7,260,312 B2 | 8/2007 | Srinivasan et al. | |
| 7,779,181 B2 | 8/2010 | Plourde et al. | |
| 8,005,861 B2 * | 8/2011 | Reddy | G06F 17/30312 707/790 |
| 8,019,941 B2 * | 9/2011 | Mann et al. | 711/114 |
| 8,079,053 B2 | 12/2011 | Yampanis et al. | |
| 8,255,545 B1 * | 8/2012 | Schmidt | H04L 67/1095 709/227 |

(Continued)

FOREIGN PATENT DOCUMENTS

CN 102521309 6/2012

OTHER PUBLICATIONS

Hua et al., "Video Delivery Technologies for Large-Scale Deployment of Multimedia Applications", Proceedings of the IEEE, Sep. 2004, 13 pages.*

(Continued)

*Primary Examiner* — Monica M Pyo
(74) *Attorney, Agent, or Firm* — Philip H. Burrus, IV

(57) ABSTRACT

A remote storage digital video recording system (300) comprises a storage server (310). The storage server can include a memory (412) and a control circuit (410) operable with the memory. The storage server can be in communication across a network (311) with one or more client devices (306,307,308). The control circuit can be configured to create a file allocation table (314) to organize clusters (330) of a computer readable medium (308). The file allocation table can include a plurality of distinguishable file entries (320,321,322). Each of the distinguishable file entries can index clusters of the computer readable medium. At least two of the plurality of distinguishable file entries can index selfsame clusters (331) of the computer readable medium.

20 Claims, 7 Drawing Sheets

(56) References Cited

U.S. PATENT DOCUMENTS

| | | | |
|---|---|---|---|
| 8,285,681 | B2 | 10/2012 | Prahlad et al. |
| 8,316,409 | B2 | 11/2012 | Strothmann |
| 8,776,158 | B1* | 7/2014 | Cote .................... H04N 21/232 725/116 |
| 2002/0124133 | A1* | 9/2002 | Duruoz ........................ 711/112 |
| 2004/0187159 | A1 | 9/2004 | Gaydos et al. |
| 2005/0086696 | A1 | 4/2005 | Daniels |
| 2005/0120386 | A1 | 6/2005 | Stone |
| 2005/0152251 | A1* | 7/2005 | Harumatsu ........ G11B 7/00745 369/53.2 |
| 2005/0286855 | A1* | 12/2005 | Saitou .................. G06F 3/0613 386/329 |
| 2007/0180465 | A1 | 8/2007 | Ou et al. |
| 2008/0072265 | A1 | 3/2008 | Kim et al. |
| 2008/0133922 | A1 | 6/2008 | Williams |
| 2010/0011390 | A1 | 1/2010 | Coles et al. |
| 2010/0023491 | A1* | 1/2010 | Huang .................... H04L 41/28 707/E17.014 |
| 2010/0293584 | A1 | 11/2010 | Civanlar et al. |
| 2010/0319044 | A1 | 12/2010 | Agans et al. |
| 2011/0052157 | A1 | 3/2011 | Pickelsimer et al. |
| 2011/0229105 | A1 | 9/2011 | Khan et al. |
| 2011/0270887 | A1* | 11/2011 | Reddy ............... G06F 17/30312 707/790 |
| 2012/0079192 | A1 | 3/2012 | Jaquette |
| 2012/0079223 | A1 | 3/2012 | Jaquette |
| 2012/0120382 | A1 | 5/2012 | Silny et al. |
| 2012/0131146 | A1* | 5/2012 | Choi .................... H04L 65/4069 709/219 |
| 2012/0151042 | A1 | 6/2012 | Garg et al. |
| 2012/0210382 | A1 | 8/2012 | Walker et al. |
| 2012/0317222 | A1 | 12/2012 | Almeida |
| 2014/0297804 | A1* | 10/2014 | Shivadas et al. ............. 709/219 |

OTHER PUBLICATIONS

"Publication", "Remote Storage DVR Technology"; *SeaChange WhitePaper*; Published Mar. 16, 2012.

"Article", "The FAT File System" *TechNet Articles*; http://social.technet.microsoft.com/wiki/contents/articles/6771.the-fat-file-system.aspx; Published Prior to Filing Date of Application.

* cited by examiner

REMOTE STORAGE DIGITAL VIDEO RECORDING OPTIMIZATION METHOD AND SYSTEM

BACKGROUND

Technical Field

This disclosure relates generally to storage systems, and more particularly to storage systems for media content.

Background Art

Digital video recorders (DVRs) have transformed how people consume media content. Using television as an example, there was a time when one had to be in front of the television to watch a particular show. The advent of video recorders allowed time shifting, and permitted viewers to watch shows at later times. While effective, video recorders relied upon analog tapes that were of less than optimal quality, were prone to breakage, and that were time consuming to rewind and fast-forward. Digital video recorders revolutionized time shifting by alleviating these problems. Digital video recorders allow viewers to quickly and simply make digital recordings on a hard disk or other storage medium.

Early digital video recorders relied upon local hard drives for their operation. When a viewer recorded a particular show, a digital video recorder at the viewer's home and connected to the viewer's television received the show and wrote its data to a hard disk stored in side the recorder. While this method worked well in practice, there is a demand for increased flexibility in how media content is consumed, stored, and managed by users.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
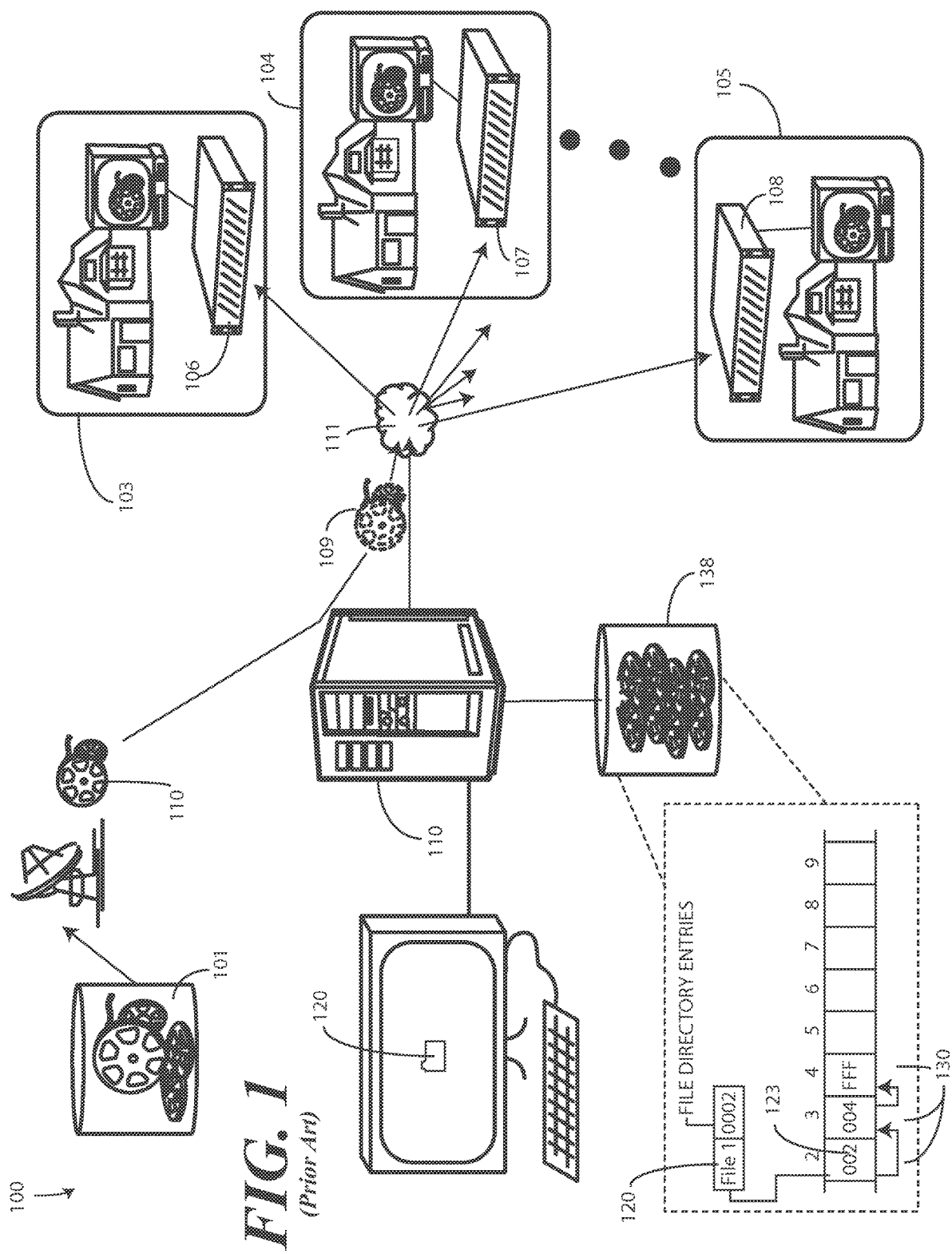
FIG. 1 illustrates a prior art system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to a storage server for use with media content. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of storage optimization as described herein. The non-processor circuits may include, but are not limited to, a radio receiver, a radio transmitter, signal drivers, clock circuits, power source circuits, and user input devices. As such, these functions may be interpreted as steps of a method to perform storage optimization. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Remote storage digital video recording is offering increased flexibility in how media content is consumed, stored, and managed by users. Remote storage digital video recorders (RS-DVRs) are sometimes known as network personal video recorders (NPVR). In a remote storage digital video recording system, rather than a user storing content in the consumer's recording device, the content is stored on one or more storage servers that are accessible by a user device across a network.

In remote digital video recording systems, content is captured at the network level and stored. The user can then access the content through their user device. Stored programs are generally only accessible by their owners, and may be subject to legal restrictions and regulations.

In remote digital video recording systems, the data associated with media content files can be voluminous. For example, the audio and visual data for a feature-length movie can be in the range of several gigabytes. Even a thirty-minute television program can run several hundred megabytes. These large file sizes tax the storage capacity of the storage server(s) in a remote digital video recording system. Moreover, when multiple users record the same movie again and again, the same multi-gigabyte file is replicated again and again at the storage server(s). In prior art systems, especially where regulatory or other considerations require each user of the system to have their own individually accessible file, the replication reduces efficiency and increases the overall cost of the system.

Embodiments of the present disclosure provide a solution to this memory consumption while still meeting the regulatory and other considerations that each user have their own individually accessible file. Embodiments of the disclosure are directed to an optimized method for providing remote storage for digital video recordings. Embodiments of the disclosure contemplate that a plurality of users using a remote storage digital video recording system will, from time to time, record the same data. For example, multiple users may record the same movie, television program, or sporting event. Embodiments of the disclosure detect these "duplicate content" recordings and write the actual content as data in a storage server only once. When subsequent "duplicate" recordings are made, control circuit of one or more storage servers creates, in a file allocation table, distinguishable file entries for each recording. Accordingly, each user has a separate and distinguishable file in the file allocation table. However, each of these separate and distinguishable files indexes the selfsame clusters, which are clusters containing the content data. Thus, if five users record an episode of Modern Family, five separate and distinct files will be created—one for each user—in the file allocation table. Each of these five files, however, will index the selfsame clusters containing the data for the episode. Note that as used herein, "selfsame" is used in accordance with its Standard English dictionary definition, i.e., "the same or exactly the same."

In one embodiment, a storage server of a remote storage digital video recording system includes a memory and a control circuit. The memory includes computer readable media, such as disk storage, solid-state storage, or equivalents, for storing media content offering data. In one or more embodiments, the control circuit is configured to create a file allocation table to organize clusters of the computer readable medium. The file allocation table includes a plurality of distinguishable file entries. Accordingly, if user A records episode 9 of Modern Family, this would constitute one distinguishable file entry. Similarly, if user B records episode 9 of Modern Family, this is another distinguishable file entry. If user C records an Atlanta Braves game, this constitutes a third distinguishable file entry, and so forth. Each of the distinguishable file entries indexing clusters of the computer readable medium.

In the example of the preceding paragraph, note that user A and user B both recorded the same episode of Modern Family. In one or more embodiments, the control circuit only records the data for this episode once on the computer readable medium. As such, episode 9 would be written to one set of clusters on the computer readable medium. However, to provide each user with their own distinguishable file entry, the control circuit will create two distinguishable file entries in the file allocation table that index the selfsame clusters of the computer readable medium, namely, the clusters in which episode 9 is recorded. The fact that multiple distinguishable file entries index the selfsame clusters results in enormous storage savings at the storage server. At the same time, the fact that separate and distinguishable file entries are created for each user's recording means that user devices in communication with the storage server are unaware that only a single copy of the content is stored. The storage server accordingly can make those client devices, which are remote, perceive a first distinguishable file entry and a second distinguishable file entry index different clusters when they actually index the same clusters.

Turning now to FIG. 1, illustrates therein is a prior art network digital video recording system 100. The system 100 includes a storage server 110 that is in communication with one or more client devices 106,107,108 belonging to one or more users 103,104,105. The system 100 allows the users 103,104,105 to record content 109 on a computer readable medium 138 at the storage server 110 for later consumption through their client devices 106,106,108.

A content provider 101 provides the content 109 to each client device 106,107,108 across a network 111. Using a remote control or other control device, a particular user, e.g., user 103, can elect record the content 109 for consumption at a later time. When this occurs, the storage server 110 records data 123 corresponding to the content 109 on one or more clusters 130 of the computer readable medium 138.

When one user, e.g., user 103, records content, the storage server 110 creates a file 120 for the content 109. The file 120 indexes the clusters 130 where the data 123 are stored. After this is complete, any of the other users 104,105 are able to access and consume the content 109 via their respective client devices 107,108 by accessing the file 120. As other users 104,105 record other content, the storage server 110 creates additional separate and distinct files. These additional files will index other clusters of the computer readable medium 138, as the content being recorded is different. At the same time, these additional files will still be accessible to all users 103,104,105. In short, every recording results in a separate and dedicated file indexing different clusters of the computer readable medium 138.

Figure 2:
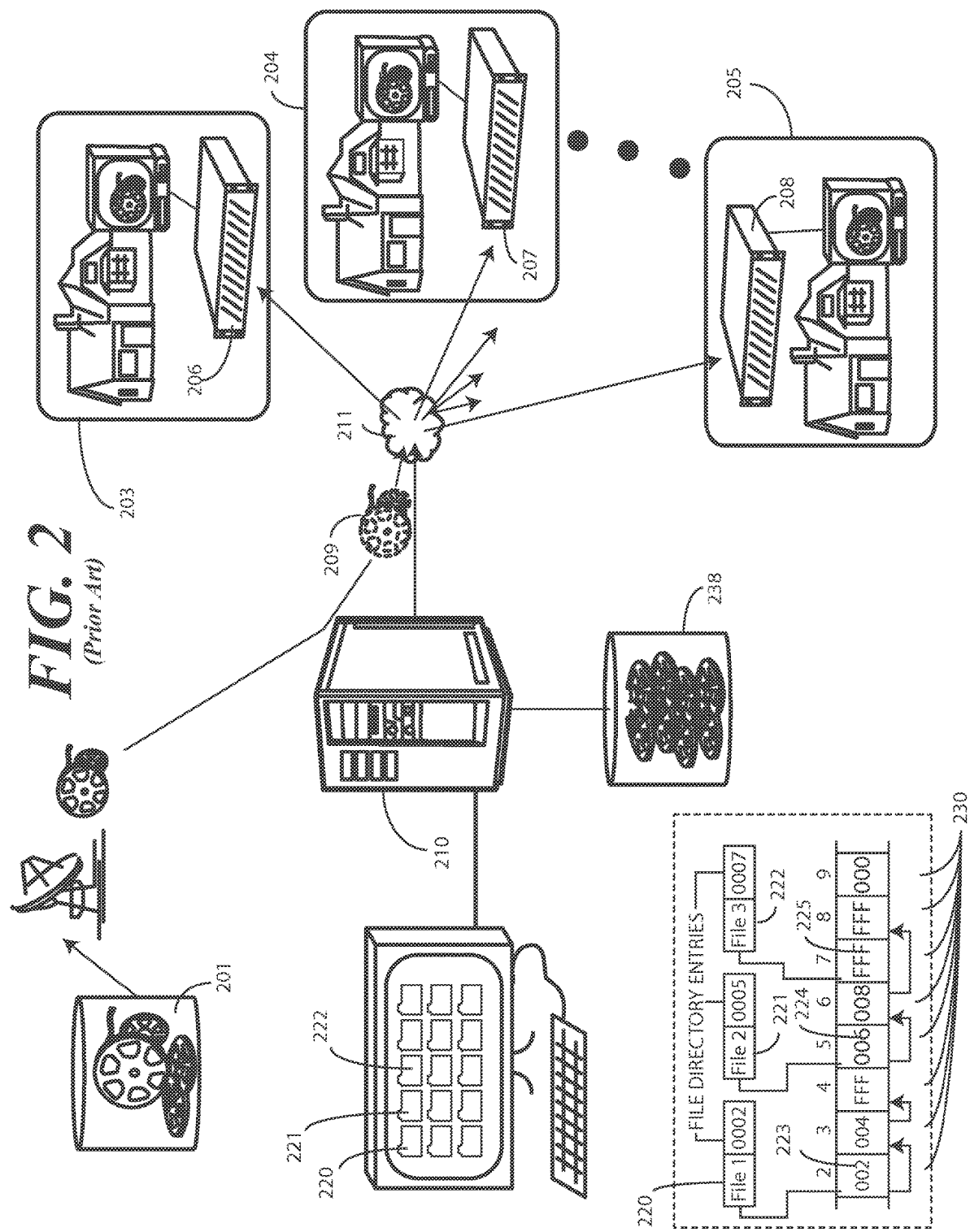
FIG. 2 illustrates another prior art system.

A problem with network digital recording systems 100, such as that shown in FIG. 1, is that there is an open question regarding whether allowing all users 103,104,105 to access a common file may violate US copyright law. The same question has been settled, however, with respect to remote storage digital video recording systems. Turning now to FIG. 2, illustrated therein is one example of a prior art remote storage digital video recording system 200.

The prior art remote storage digital video recording system 200 includes a storage server 210 that is in communication with one or more client devices 206,207,208 belonging to one or more users 203,204,205. The prior art remote storage digital video recording system 200 allows the users 203,204,205 to record content 209 on a computer readable medium 238 at the storage server 210 for later consumption through their client devices 206,206,208.

A content provider 201 provides the content 209 to each client device 206,207,208 across a network 211. Using a remote control or other control device, a particular user, e.g., user 203, can elect record the content 209 for consumption at a later time. When this occurs, the storage server 210 records data 223 corresponding to the content 209 on one or more clusters 230 of the computer readable medium 238.

As each user 203,204,205 elects to record data with their client device 206,207,208, the storage server 210 writes to more and more sectors of the computer readable medium 238. As this is a prior art remote storage digital video recording system 200, rather than recording a user's desired content in the client devices 206,207,208, all data is recorded at the storage server 210. Accordingly, the computer readable medium 238 will typically have a large storage capacity. In short, the storage server 210 will generally be an advanced video server operating in a network and having a memory with a large storage space.

It is well to note that a prior art remote storage digital video recording system 200, such as that shown in FIG. 2, differs in concept from the prior art network digital video recording system (100) described above. The primary difference occurs in how content is recorded. As noted above, in the prior art network digital video recording system (100), a particular user (103) can record content (109) and other users (104,105) can then access that content (109) by accessing a dedicated file (120) indexing clusters (130) of the computer readable medium (138) where data (123) corresponding to the content (109) is stored. By contrast, in prior art remote storage digital video recording systems 200, the storage server 210 records and stores data for every program requested and allows only the user who actually initiated the recording to access the content. Accordingly, in the prior art remote storage digital video recording system 200, the storage server 210 creates a separate, dedicated file 220,221,222, as well as a separate copy of the data 223,224, 225, each and every time a user 203,204,205 records a program.

One of the reasons the storage server 210 creates a separate, dedicated file 220,221,222, as well as a separate copy of the data 223,224,225, each and every time a user 203,204,205 records a program is due to a court ruling interpreting US copyright law. In *Cable News Network* vs. *CSC Holdings*, 536 F.3d 121 (2d Cir. 2008), cert. denied, the Supreme Court let stand a decision from the Second Circuit held that by creating a separate, dedicated file 120,121,122 for each recording, a prior art remote storage digital video recording system 200 is in compliance with fair use rules because the only difference between users 203,204,205 recording content 209 on locally on their client devices 206,207,208 and recording the content 209 at a storage server 210 is location. This singular difference hinges, however, upon each user's recording initiation resulting in a separate, dedicated file 220,221,222.

Figure 3:
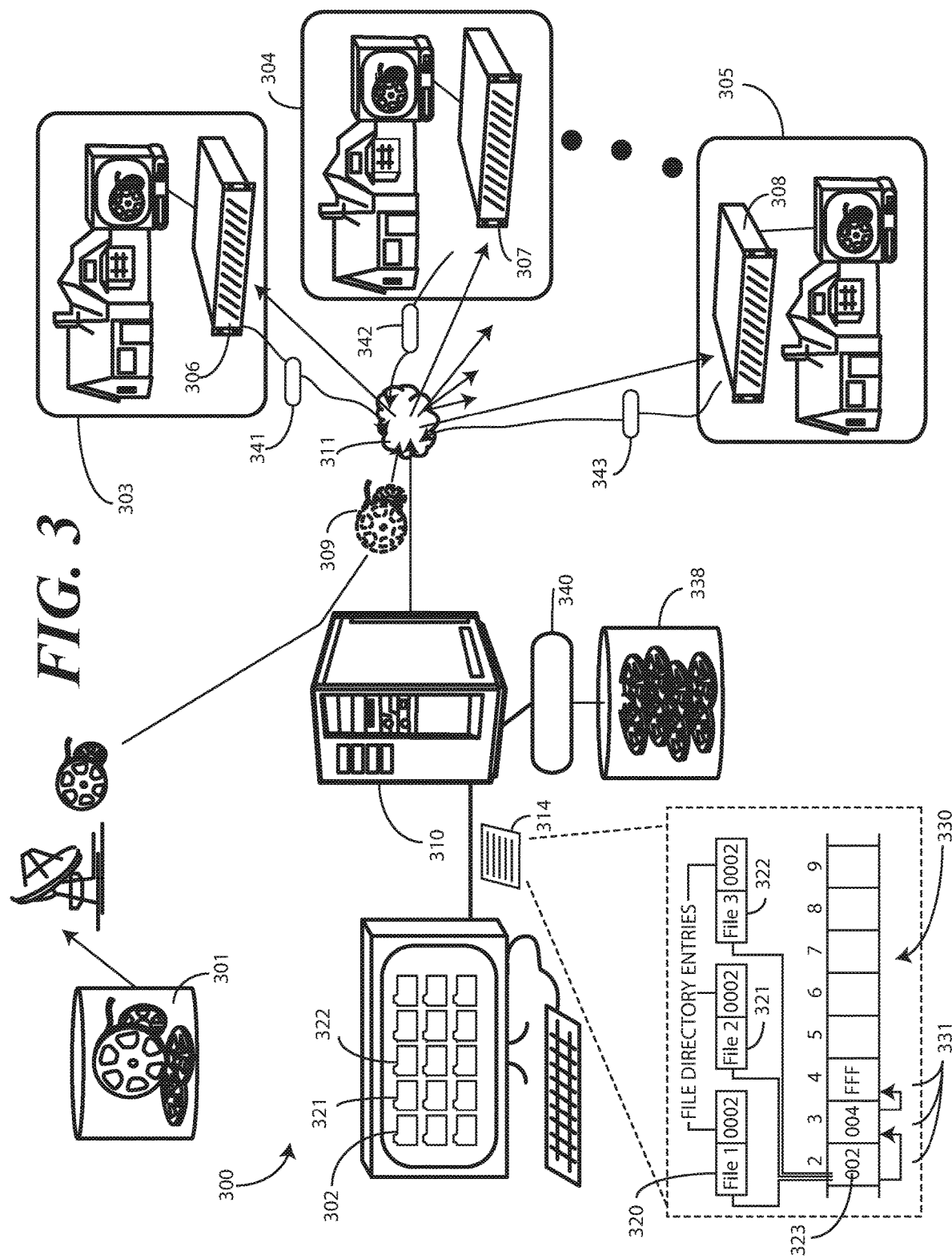
FIG. 3 illustrates an explanatory system configured in accordance with one or more embodiments of the disclosure.

Turning now to FIG. 3, illustrated therein is a remote storage digital video recording system 300 configured in accordance with embodiments of the disclosure. FIG. 3 illustrates a macro-level view of the remote storage digital video recording system 300, while more detailed structures will be described in more detail later. The remote storage digital video recording system 300 of FIG. 3 is suitable for implementing the methods of creating a file allocation table 314 to organize clusters 326 of the computer readable medium 308, where the file allocation table 314 comprises a plurality of distinguishable file entries 320,321,322, with each of the distinguishable file entries 320,321,322 indexing clusters 330 of the computer readable medium 308, but where at least two of the plurality of distinguishable file entries 320,321 indexing selfsame clusters 331 of the computer readable medium 308 as described in subsequent figures.

The remote storage digital video recording system 300 of FIG. 3 includes a storage server 310 that is in communication with one or more client devices 306,307,308 belonging to one or more users 303,304,305 across an interactive network 311. In one embodiment, the storage server 310 comprises a video recording device. The interactive network 311 may be any type of network capable of transferring data electronically, such as, but not limited to, cable networks, the Internet, wireless networks, Telco networks, or satellite networks. It will be clear to those of ordinary skill in the art having the benefit of this disclosure that embodiments are not so limited. Other networks can be used as well.

The remote storage digital video recording system 300 allows the users 303,304,305 to record content 309 on a computer readable medium 308 at the storage server 310 for later consumption through their client devices 306,306,308. Examples of client devices 306,307,308 occurring in various environments include a television, set-top-box, personal computer, laptop, smartphone, tablet computer, personal digital assistant, handheld computer, cellular telephone, or the like.

A content provider 301 provides the content 309 to each client device 306,307,308 across a network 311. The content provider 301 can originate content 309 and can deliver it to a server complex comprising the storage server 310 for distribution to the client devices 306,307,308. The content 309 can be delivered in various formats and protocols, depending upon the type of system employed. For example, content provider 301 may provide the content 309 by RF signals by satellite, ATM data from ATM networks, local feeds, and other information via terrestrial link. The content providers 301 may also transmit digital files across the interactive network 311.

The storage server 310 is configured to receive record signals 341,342,343 from the client devices 306,307,308 to initiate recording operations. Using a remote control or other control device, a particular user, e.g., user 303, can elect record the content 309 for consumption at a later time. When this occurs, the storage server 310 records data 323 corresponding to the content 309 on one or more clusters 330 of the computer readable medium 308.

The storage server 310 of FIG. 3 differs from the storage server (110) of FIG. 1 and the storage server (210) of FIG. 2 in that it includes a file allocation table manager 340, operable with the control circuit of the storage server 310, that causes the control circuit to create a file allocation table 314 to organize clusters 330 of the computer readable medium 308 that is accessible through the memory of the storage server 310. As each user 303,304,305 elects to record content 309 with their client device 306,307,308, the file allocation table manager 340 creates a distinguishable file entry, e.g., distinguishable file entry 320, in the file allocation table 314. Said differently, the control circuit is configured to create distinguishable file entries 320,321,322 of the file allocation table 314 in response to received requests to record a particular video content offering.

However, in contrast to either the storage server (110) of FIG. 1 or the storage server (210) of FIG. 2, if a first user, e.g., user 303, has recorded a particular content offering, thereby causing data 323 corresponding to the particular content offering to have already been written to clusters 330 of the computer readable medium 308, when a second user, e.g., user 304, records the same content, the control circuit of the storage server 310 does not duplicate the corresponding data 323. Instead, the file allocation table manager 340 causes the control circuit to creates a separate and distinct file entry, e.g., distinguishable file entry 321 that indexes the selfsame clusters 331 to which the data 323 is written. The selfsame clusters 331 comprise the data 323 for the video content offering. Accordingly, when a second recording is initiated, if the data corresponding to that recording is stored in clusters 330 of the computer readable medium 308, a second distinguishable file entry will be crated in the file allocation table 314. Rather than referencing different clusters of the computer readable medium 308 as in prior art solutions, the distinguishable file entry will index selfsame clusters as did the previous recording.

Advantageously, the storage server 310 of FIG. 3 looks to remote devices as does the prior art storage server (210) of FIG. 2 in that each recording is identified by a separate and distinguishable file entry. However, rather than each file entry indexing different clusters of the computer readable medium 308, file entries corresponding to selfsame content indexes selfsame clusters 331 of the computer readable medium 308.

Illustrating by example, in FIG. 3 there are three distinguishable file entries 320,321,322 in the file allocation table 314. distinguishable file entries 320,321 correspond to selfsame content. Accordingly, both file entry 302 and distinguishable file entry 321, despite being distinguishable in the file allocation table 314, reference selfsame clusters 331 of the computer readable medium 308. This results in space savings in the computer readable medium 308 in that each content offering recorded is only stored once. Simultaneously, the file allocation table manager 340 causes the control circuit to create a separate and distinguishable file entry 320,321,322 for each recording that is accessible only by the user that initiated the recording. As the storage server 310 can be configured to determine a unique device identifier for each of the client devices 306,307,308, the storage server 310 can limit accessibility to each distinguishable file entry 320,321,322 to only the client device that initiated the recording. Examples of device identifiers include a MAC address or IP address in a computer environment, a mobile telephone number in a mobile environment, a serial number or other unique identifier in a set-top box environment, and so forth.

While the selfsame clusters 331 will be the same with respect to the data content, headers, metadata, and other information in each distinguishable file entry 320,321,322 can be different. For example, in one embodiment header information for a particular file entry, e.g., distinguishable file entry 320, may identify a user, e.g., user 303, or a client device, e.g., 306, that initiated the recording. Accordingly, in one or more embodiments, the at least two of the plurality of distinguishable file entries 320,321 will comprise metadata identifying owners of data 323 represented by the selfsame clusters 331. In one or more embodiments, the owners will be different. This information, which can also be stored in clusters 330 on the computer readable storage medium 338, will be different from the information stored in the header of distinguishable file entry 321. However, the content data will be stored in the selfsame clusters 331. Accordingly, distinguishable file entries 320,321 for the same content 309 can, in one or more embodiments, index some different clusters of the computer readable storage medium 338, e.g., owner, permissions, etc., and will also index selfsame clusters 331 as well.

The remote storage digital video recording system 300 provides optimized storage in the computer readable medium 308 and is designed and developed to recognize the unique nature of storage usage occurring in the remote storage digital video recording system 300. In one or more embodiments, the optimized storage provided by the control circuit and file allocation table manager 340 of the storage server 310 allows for simultaneous recording of the same content 309, at the same time, in response to requests from hundreds if not thousands of different users, e.g., users 303,304,305. Embodiments of the remote storage digital video recording system 300 allow each user's recordings to be stored with separate, distinguishable, and unique, distinguishable file entries 320,321,322 in the file allocation table on a one file entry-per-subscriber-per-recording basis.

In one or more embodiments, the remote storage digital video recording system 300 includes standard input and output capabilities. For example, in one or more embodiments, the remote storage digital video recording system 300 can function to provide support for file input and output libraries and functions. In one or more embodiments, a purveyor of the remote storage digital video recording system 300 can use, for example, a "fcreate" command to create a file entry, a "fopen" command to open a file entry, a "fread" command to read data indexed by a file entry, an "fwrite" command to write to a file entry, and so forth.

Embodiments of the disclosure contemplate that when the storage server 310 is in operation, users 303,304,305 may cause large numbers, e.g., hundreds to tens of thousands, of the same content to be recorded at the same time. Embodiments of the disclosure provide each user 303,304,305 with their own distinguishable file entry 320,321,322 while optimizing storage space by recording the data only once. In one embodiment, the control circuit of the storage sever 310 is configured to detect simultaneous recording instances and will write the common data 323 to clusters 330 of the computer readable medium 308 only once. The file allocation table manager 340 then causes the control circuit to maintain an appropriate file allocation table 314 having distinguishable file entries 320,321 for selfsame clusters 331. For users that record a program in its entirety, this results in tremendous storage savings in the computer readable medium 308.

Consider the following example: presume user 303 starts recording content 309 when it is initially delivered to the user's client device 306. Next, presume user 304 starts recording the content 309 ten minutes later. When user 303 begins recording the content, the control circuit of the storage server 310 creates a first distinguishable file entry 320 indexing data 323 corresponding to the content 309 being written to clusters 330 (at selfsame clusters 331) of the computer readable medium 308. When user 304 starts recording the content 309, the control circuit creates a second distinguishable file entry 321 indexing selfsame clusters 331 of the computer readable medium 308 while those selfsame clusters 331, which are indexed by the first distinguishable file entry 320, are being written. As the data 323 corresponding to the content 309 are only written once, the data 323 written to the selfsame clusters 331 of the computer readable medium 308 will be different from any other clusters 330 of the computer readable medium 308.

The storage server 310 can manage the selfsame clusters 331 in a variety of ways. In one embodiment, the storage server 310 can maintain the data 323 in the selfsame clusters 331 until each user, i.e., users 303,304 of this example, have accessed their respective distinguishable file entries 320, 321. Accordingly, in one or more embodiments, where the two distinguishable file entries 320,321 define a set of file entries for the content 309, the control circuit of the storage server 310 can be configured to delete the selfsame clusters 331 when a last member of the set accesses the selfsame clusters 331. In another embodiment, the control circuit of the storage server 310 can erase the data 323 when the metadata of the distinguishable file entries 320,321 is changed to identify there are no longer owners of the data 323.

When the client devices 306,307, which are remote across the interactive network 311 relative to the storage server 310, access the data 323 corresponding to the content 309, a communication interface of the storage server 310 causes the client devices 306,307 to perceive that the two distinguishable file entries 320,321 index different clusters 330 of the computer readable medium 308. This allows legacy client devices, such as those configured to operate with the prior art remote storage digital video recording system (200) of FIG. 2, to be used with the storage server 310 configured in accordance with embodiments of the disclosure. The legacy client devices simply read the distinguishable file entries 320,321 just as they would in the prior art system. They do not have information indicating that the distinguishable file entries 320,321 index selfsame clusters 331. Accordingly, applications on remote devices that avail themselves of storage in the computer readable medium 308 of the storage server 310 are unaware that any optimization is occurring. Such applications operate without modification or update. Such applications will create files, write to files, read from files, and delete files. The detection of simultaneous, common-program recording will occur at the file system level, with optimization at the disk storage level, and the applications will be unaware of this.

In one or more embodiments, a "fread," "fgets," and other file system commands, when executed in the remote storage digital video recording system 300, will work just as they do in the prior art remote storage digital video recording system (200). However, the "fdelete" command is unique in the remote storage digital video recording system 300 of FIG. 3. In one or more embodiments, a "fdelete" command will not instantly erase data 323 in selfsame clusters 331 where there are multiple distinguishable file entries 320,321 indexing those selfsame clusters 331. Instead, the control circuit of the storage server 310 will take into account the unique nature of the file allocation table 314 and will keep remaining distinguishable file entries consistent for the data 323. Accordingly, in one embodiment, the data 323 of the selfsame clusters will not be erased until a last user, i.e., a last owner of a distinguishable file entry, accesses the data 323 indexed by that file entry. APIs are trivial to code with such a file system and would work much like any file system implementation today. The key innovation is in the file system write and file system delete operations described above.

Figure 4:
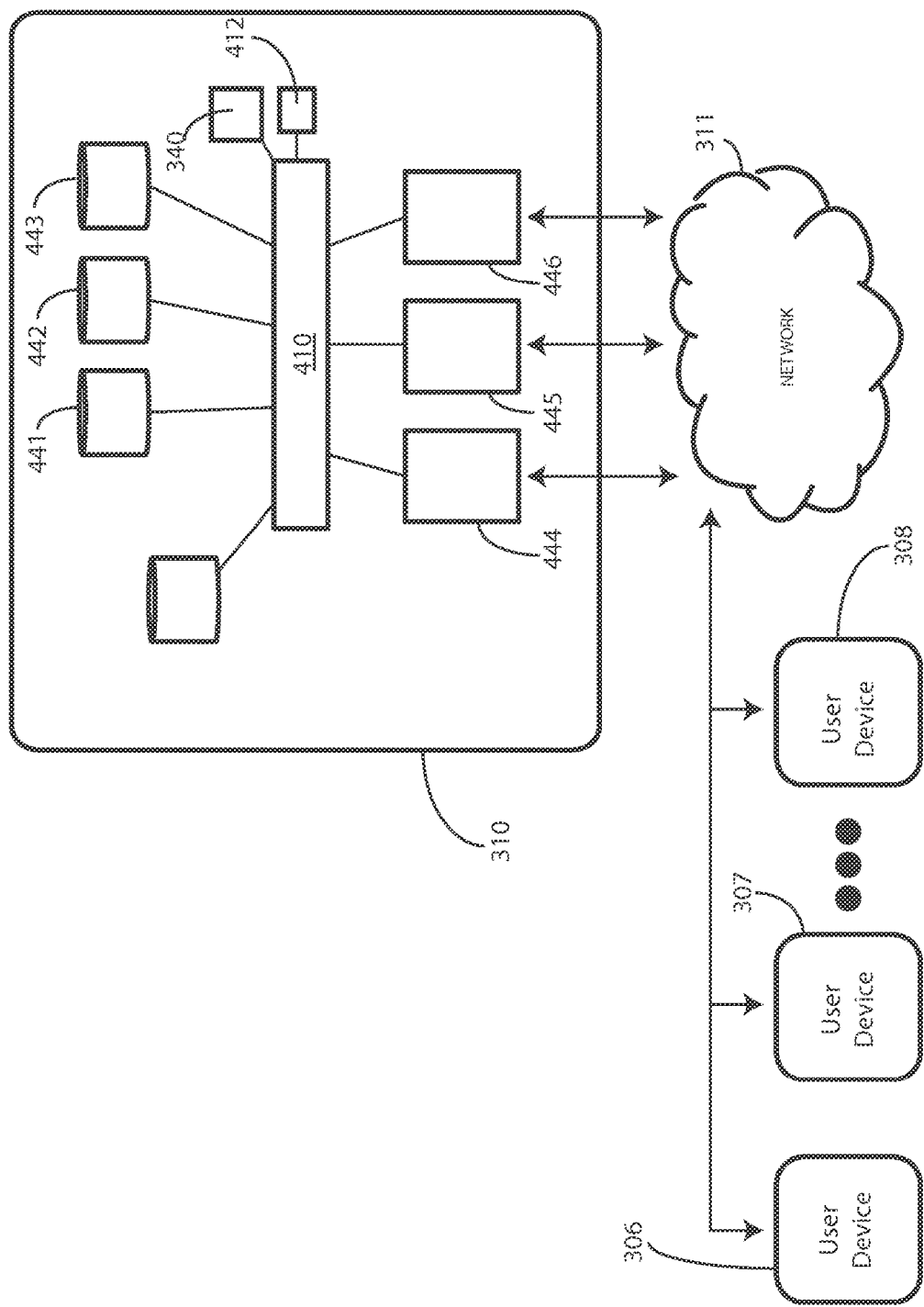
FIG. 4 illustrates an explanatory system configured in accordance with one or more embodiments of the disclosure.

Turning now to FIG. 4, illustrated therein is a schematic block diagram of portions of the remote storage digital video recording system (300) described above. As noted, the storage server 310 may include a control circuit 410 or other processing device. The control circuit 410 can be operable with a file allocation table manager 340. The control circuit 410 can also be operable with one or more memories 412 or storage devices 441,442,443. In one embodiment, these memories 412 or storage devices 441,442,443 can comprise the computer readable medium (308). One or more communication circuits 444,445,446, configured here as video streaming engines, are in communication with the remote client devices 306,307,308 across the interactive network 311.

Figure 5:
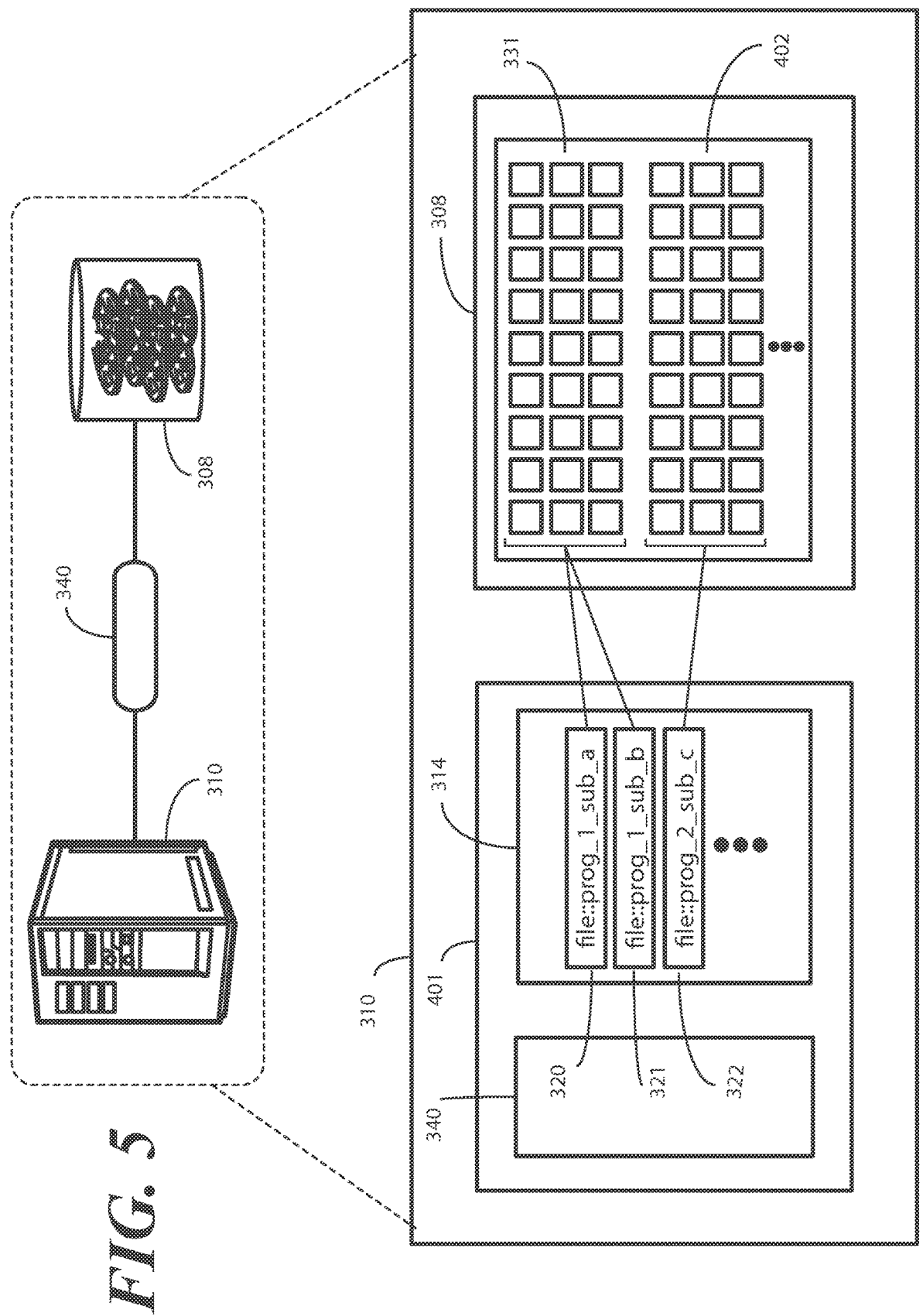
FIG. 5 illustrates an explanatory system configured in accordance with one or more embodiments of the disclosure.

Turning now to FIG. 5, illustrated therein is an operational diagram of portions of the remote storage digital video recording system (300) described above. Shown in FIG. 5 are the storage server 310, the computer readable medium 308, and the file allocation table manager 340. In this illustrative embodiment, the file allocation table manager 340 and the file allocation table 314 reside in an optimized file system 401 of the storage server 310. At least two distinguishable file entries 320,321 index selfsame clusters 331 because they correspond to the same content offering. A third distinguishable file entry 322 indexes different clusters 402 because it corresponds to a different content offering.

As noted above, the file allocation table manager 340 plays a central role in this system. Specifically, the file allocation table manager 340 adds an awareness in the optimized file allocation system to the special conditions of the various distinguishable file entries 320,321 in which several users (303,304) are causing the exact same data for the exact same content to be written to a single set of clusters, i.e., selfsame clusters 331, indexed by different files.

In this illustration, two content offerings are being recorded. First content offering, which corresponds to distinguishable file entry 320 and distinguishable file entry 321, is being written to selfsame clusters 331, while a second content offering, which corresponds to distinguishable file entry 322, is being written to clusters 402. This is due to the fact that two users have opted to record the same content offering. The third user has opted to record a different program. Accordingly, three distinguishable file entries 320, 321,322 are created. Each user therefore has their own file entry representing their recording of a program. However, only two data sets are written to the clusters of the computer readable medium 308. One is indexed by distinguishable file entries 320,321, while the other is indexed by distinguishable file entry 322. The file allocation table 314 maintains common file allocation table entries such that the file for the two users recording the same content offering refers to a shared or common set of block storage.

Figure 6:
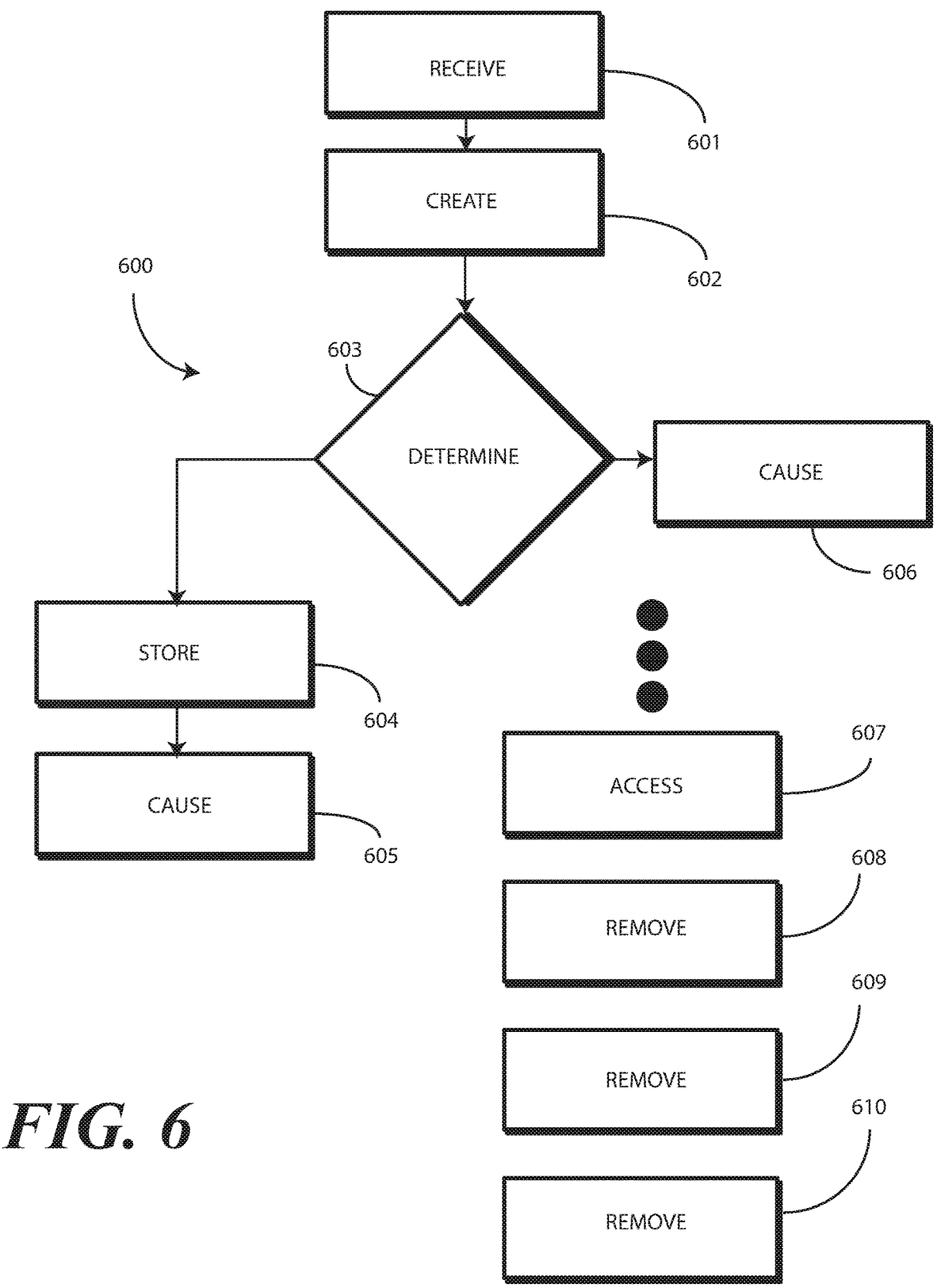
FIG. 6 illustrates an explanatory method configured in accordance with one or more embodiments of the disclosure.

Turning now to FIG. 6, illustrated therein is a method 600 of optimizing storage in a storage server. The method 600 is suitable for use in a remote storage video recording system in one or more embodiments. The method 600 is also suitable for coding as executable instructions for a control circuit of a storage server operating in a remote storage recording system as well.

At step 601, the method 600 receives a request to record a particular content offering. At step 602, the method 600 creates a first distinguishable file entry in a file allocation table corresponding to the recording. In one or more embodiments, step 602 comprises creating metadata for each distinguishable file entry created. In one or more embodiments, the metadata defines an owner of the data that is to be indexed by the distinguishable file entry created.

At decision 603, the method 600 determines whether data corresponding to the content offering are recorded on clusters of a computer readable medium. Where they are not, the method 600 stores data corresponding to the content offering in one or more clusters of the computer readable medium at step 604. In one embodiment, the one or clusters are in a memory operable with a storage server comprising a control circuit operable with the memory. At step 605, the method 600 causes the first distinguishable file entry to index the clusters to which the data were written.

The method then returns to step 601. At the second iteration of step 601, the method receives a request to record a particular content offering. At the second iteration of step 602, the method 600 creates a second distinguishable file entry in the file allocation table.

Again at decision 603, the method 600 determines whether data corresponding to the content offering is recorded on clusters of a computer readable medium. In one or more embodiments, the determination at decision 603 can comprise referencing the first distinguishable file entry. In one or more embodiments, the second iteration of decision 603 occurs prior to the second iteration of step 602. Said differently, in one or more embodiments the determination that the data are stored on the one or more clusters of the computer readable medium occurs prior to creating the second distinguishable file entry.

Where the data are not stored on the computer readable medium, steps 603,604,605 can be repeated. Where they are, the method 600 causes the second distinguishable file entry to index the clusters to which the data were previously written at step 606. The method 600 can repeat to create a third distinguishable file entry in the file allocation table also indexing the one or more clusters, and so forth.

In one or more embodiments, the second iteration of step 602 occurs while the first iteration of step 604 is occurring. Said differently, in one or more embodiments, the creation of the second distinguishable file entry happens while the storing of the data occurs.

In parallel with the distinguishable file entry creation, users can be consuming the data. For example, at step 607, one or more owners can access the data. At optional step 608, the method 600 can comprise removing owners from the metadata after they have accessed the data. At optional step 609, the method 600 can comprise removing the data from the one or more clusters after all owners have accessed the data.

In one or more embodiments, at optional step 610, the method 600 can cause at least one remote device in communication with, for example, a control circuit executing the method, to perceive the first distinguishable file entry and the second distinguishable file entry to index different clusters. Inclusion of this optional step 610 allows the method 600 to be used with legacy remote devices configured for communication with prior art remote storage digital video recording systems.

Figure 7:
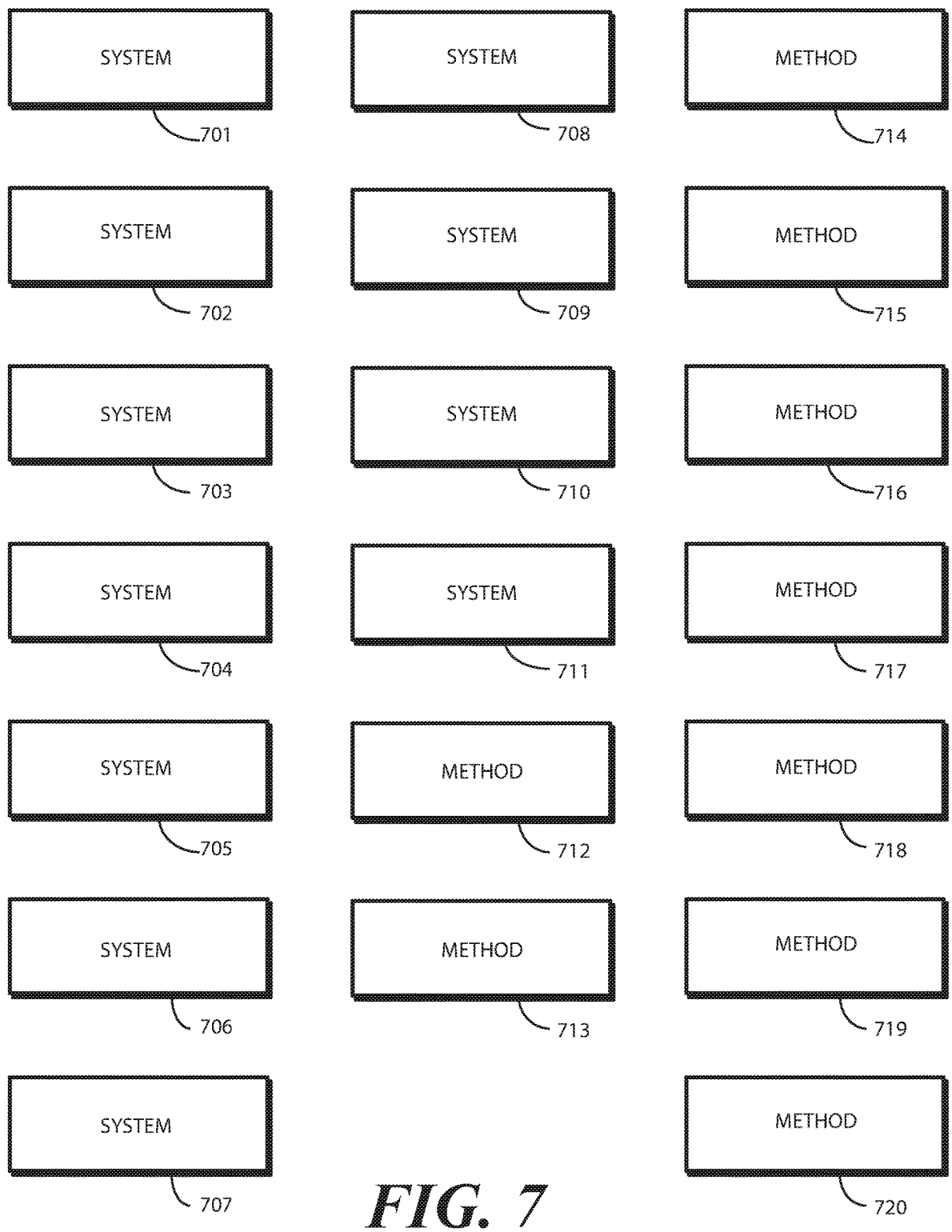
FIG. 7 illustrates various embodiments of the disclosure.

Turning now to FIG. 7, illustrated therein are various embodiments of the disclosure. At 701, a system comprises a storage server comprising a memory and a control circuit operable with the memory. At 701, the storage server is in communication across a network with one or more client devices. At 701, the control circuit is configured to create a file allocation table to organize clusters of the computer readable medium. At 701, the file allocation table comprises a plurality of distinguishable file entries, with each of the distinguishable file entries indexing clusters of the computer readable medium. At 701, at least two of the plurality of distinguishable file entries indexing selfsame clusters of the computer readable medium.

At 702, the control circuit of 701 is configured to create a second distinguishable file entry while the selfsame clusters indexed by a first distinguishable file entry are written. At 703, the selfsame clusters of 701 comprise data different from any other clusters of the computer readable medium.

At 704, the at least two of the plurality of distinguishable files of 701 comprise a set of distinguishable files. At 704, the control circuit of 701 is configured to delete the selfsame clusters when a last member of the set accesses the selfsame clusters.

At 705, the system of 701 further comprises a communication interface in communication with one or more remote devices. At 705, the communication interface causes the one or more remote devices to perceive the at least two of the plurality of distinguishable file entries of 701 to index different clusters.

At 706, the storage server of 701 comprises a video recording device. At 707, the selfsame clusters of 701 comprise data of a video content offering. At 707, the control circuit of 701 is to create entries of the file allocation table in response to received requests to record the video content offering.

At 709, the at least two of the plurality of distinguishable file entries of 701 comprise metadata identifying owners of data represented by the selfsame clusters. At 710, the owners of 709 are different. At 711, the control circuit of 701 is to erase the data when the metadata is changed to identify no owners of the data.

At 712, a method comprises storing data in one or more clusters of a computer readable medium in a memory operable with a storage server comprising a control circuit operable with the memory. At 712 the method creates a first distinguishable file entry in a file allocation table indexing the one or more clusters. At 712, the method creates a second distinguishable file entry in the file allocation table also indexing the one or more clusters. At 713, the method creates at least a third distinguishable file entry in the file allocation table also indexing the one or more clusters.

At 714, the method of 712 creates the second distinguishable file entry while the storing occurs. At 715, the method of 712 determines the one or more clusters are stored on the computer readable medium prior to creating the second distinguishable file entry. At 716, the method of 715 determines by referencing the first distinguishable file entry.

At 717, the method of 712 further comprises creating metadata for each distinguishable file entry, the metadata defining an owner of the data. At 718, the method of 717 removes owners from the metadata after they have accessed the data. At 719, the method of 718 removes the data from the one or more clusters after all owners have accessed the data. At 720, the method of 712 causes at least one remote device in communication with the control circuit to perceive the first distinguishable file entry and the second distinguishable file entry to index different clusters.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A system, comprising:
a storage server comprising a memory and a control circuit operable with the memory, the storage server in communication across a network with one or more client devices, the control circuit to:

create a file allocation table to organize clusters of a computer readable medium;

the file allocation table comprising a plurality of distinguishable file entries, each of the distinguishable file entries identifying a content offering and indexing clusters of the computer readable medium;

at least two of the plurality of distinguishable file entries identifying a common content offering directly indexing selfsame clusters of the computer readable medium to which data of the common content offering is written.

2. The system of claim 1, the control circuit to create a second distinguishable file entry while the selfsame clusters indexed by a first distinguishable file entry are written.

3. The system of claim 1, the selfsame clusters of the computer readable medium comprising data different from any other clusters of the computer readable medium.

4. The system of claim 1, the at least two of the plurality of distinguishable file entries comprising a set of distinguishable files, the control circuit to delete the selfsame clusters when a last member of the set accesses the selfsame clusters.

5. The system of claim 1, further comprising a communication interface in communication with one or more remote devices, the communication interface to cause the one or more remote devices to perceive the at least two of the plurality of distinguishable file entries to index different clusters.

6. The system of claim 1, the storage server comprising a video recording device.

7. The system of claim 6, the selfsame clusters comprising a video content offering.

8. The system of claim 7, the control circuit to create entries of the file allocation table in response to received requests to record the video content offering.

9. The system of claim 1, the at least two of the plurality of distinguishable file entries comprising metadata identifying owners of data represented by the selfsame clusters.

10. The system of claim 9, the owners being different.

11. The system of claim 9, the control circuit to erase the data when the metadata is changed to identify no owners of the data.

12. A method, comprising:

storing data in one or more clusters of a computer readable medium in a memory operable with a storage server comprising a control circuit operable with the memory;

creating a first distinguishable file entry in a file allocation table directly indexing the one or more clusters; and creating a second distinguishable file entry in the file allocation table also directly indexing the one or more clusters without indexing clusters of the computer readable medium that are different from the one or more clusters.

13. The method of claim 12, further comprising creating a third distinguishable file entry in the file allocation table also directly indexing the one or more clusters.

14. The method of claim 12, the creating the second distinguishable file entry while the storing occurs.

15. The method of claim 12, further comprising determining the one or more clusters are stored on the computer readable medium prior to creating the second distinguishable file entry.

16. The method of claim 15, the determining comprising referencing the first distinguishable file entry.

17. The method of claim 12, further comprising creating metadata for each distinguishable file entry, the metadata defining an owner of the data.

18. The method of claim 17, further comprising removing owners from the metadata after they have accessed the data.

19. The method of claim 18, further comprising removing the data from the one or more clusters after all owners have accessed the data.

20. The method of claim 12, further comprising causing at least one remote device in communication with the control circuit to perceive the first distinguishable file entry and the second distinguishable file entry to index different clusters.

* * * * *